United States Patent
Kwon et al.

(10) Patent No.: US 8,368,290 B2
(45) Date of Patent: Feb. 5, 2013

(54) RECTIFIER-FREE PIEZOELECTRIC ENERGY HARVERSTER AND BATTERY CHARGER

(75) Inventors: Dongwon Kwon, Atlanta, GA (US); Gabriel Alfonso Rincon-Mora, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 135 days.

(21) Appl. No.: 13/110,629

(22) Filed: May 18, 2011

(65) Prior Publication Data
US 2011/0285131 A1   Nov. 24, 2011

Related U.S. Application Data

(60) Provisional application No. 61/345,770, filed on May 18, 2010.

(51) Int. Cl.
*H01L 41/08*   (2006.01)
(52) U.S. Cl. .................... 310/339; 310/319; 310/329
(58) Field of Classification Search .............. 310/329, 310/339, 319
See application file for complete search history.

(56) References Cited

U.S. PATENT DOCUMENTS

| | | | |
|---|---|---|---|
| 3,456,134 A | 7/1969 | Ko | |
| 5,245,242 A | 9/1993 | Hall | |
| 5,703,474 A | 12/1997 | Smalser | |
| 5,969,954 A | 10/1999 | Zaitsu | |
| 6,438,193 B1 | 8/2002 | Ko et al. | |
| 6,580,177 B1 | 6/2003 | Hagood, IV et al. | |
| 6,894,460 B2 | 5/2005 | Clingman | |
| 7,081,693 B2 | 7/2006 | Hamel et al. | |
| 7,138,911 B2 | 11/2006 | Tyndall | |
| 7,183,693 B2 * | 2/2007 | Brantner et al. | 310/319 |
| 7,429,805 B2 | 9/2008 | Hamel et al. | |
| 2003/0034715 A1 * | 2/2003 | Burns et al. | 310/339 |
| 2005/0134149 A1 | 6/2005 | Deng et al. | |
| 2006/0181176 A1 * | 8/2006 | Brantner et al. | 310/319 |
| 2009/0230924 A1 | 9/2009 | Wright | |
| 2010/0079034 A1 | 4/2010 | Ramadass et al. | |
| 2010/0271147 A1 * | 10/2010 | Leibman | 331/160 |
| 2012/0068576 A1 * | 3/2012 | Lee | 310/339 |
| 2012/0187897 A1 * | 7/2012 | Lenk et al. | 320/101 |

* cited by examiner

*Primary Examiner* — Mark Budd
(74) *Attorney, Agent, or Firm* — Bryan W. Bockhop; Bockhop & Associates, LLC

(57) ABSTRACT

A circuit for harvesting electrical energy from a piezoelectric source and for storing the electrical energy in a battery includes an inductor that is configured to store electrical energy. A diode bridge-free switching network is configured to: direct electrical energy from the piezoelectric source to the inductor during a first portion of a piezoelectric charge generating cycle; and direct electrical energy from the inductor to the battery during a second portion of the piezoelectric charge generating cycle.

20 Claims, 5 Drawing Sheets

RECTIFIER-FREE PIEZOELECTRIC ENERGY HARVERSTER AND BATTERY CHARGER

CROSS-REFERENCE TO RELATED APPLICATION(S)

This application claims the benefit of U.S. Provisional Patent Application Ser. No. 61/345,770, filed May 18, 2010, the entirety of which is hereby incorporated herein by reference.

BACKGROUND OF THE INVENTION

1. Field of the Invention

The present invention relates to electrical energy harvesting systems and, more specifically, to an electrical energy harvesting system that is rectifier free.

2. Description of the Related Art

Microscale and nanoscale integrated devices are used in a variety of applications, including in biomedical implants and sensors. Many such devices are powered by electrical energy. Conventional power sources, such as electrochemical batteries, are often used to power such integrated devices. However, in certain applications, such as biomedical implants, replacing or recharging batteries may be difficult and costly. One approach to recharging such batteries is to harvest electrical energy from piezoelectric structures subjected to ambient motion (such as muscle flexing in the case of biomedical implants or vibration in the case of environmental sensors, etc.). Typical piezoelectric structures include cantilevers made from a piezoelectric material, such as certain crystals, organic materials and ceramic structures, generate electrical charge when subject to mechanical force. For example, a zinc oxide crystal will generate a charge imbalance when subjected to a bending force. Other piezoelectric structures generate charge when subjected to stress or strain.

Given that many piezoelectric structures are subject to periodic movements that have both a positive cycle and a negative cycle (such as a vibrating cantilever), the electricity generated by a piezoelectric structure is typically in the alternating current form. However, most batteries require direct current to be recharged. Therefore, recharging a battery from a piezoelectric structure usually requires a device to convert the alternating current to direct current.

A typical microscale alternating current to direct current converter includes a diode bride rectifier. Such a rectifier employs an arrangement of diodes that channels current during both the positive cycle and the negative cycle onto an output in the form of a series of positive half-waves. In such a rectifier, current from the piezoelectric structure usually must pass through two diodes and each diode typically has a voltage drop of between 0.2 V to 0.7 V (depending on the semiconductor technology employed). This voltage drop can be greater than the voltage output from the piezoelectric structure and, therefore, usually requires that a voltage boost be applied to the output from the piezoelectric structure so that the voltage being applied to the battery is greater than the voltage of the battery, otherwise no current would flow into the battery. Such a system tends to waste a considerable amount of energy.

The problem is rectifying unpredictably small ac signals (which are prevalent in small volumes and with weak vibrations whose peak voltages fall below the rectified output level targeted, requires low-loss, no-threshold rectifiers. Quasi-lossless LC energy-transfer networks that precede or follow the rectifier can extract all the energy stored in the piezoelectric capacitance and therefore overcome the basic threshold-voltage limitation, except the rectifier and its controller's headroom and quiescent current nonetheless limit the input voltage range of the system and dissipate power.

Miniaturized mobile electronic systems, such as biomedical drug-delivery implants, acceleration-monitoring and pressure-monitoring sensors, and micro-sensor nodes in wireless networks, have so little space for energy storage that they suffer from short operational lives. Unfortunately, replacing easily exhaustible onboard batteries is prohibitive because the systems often conduct in situ measurements in unreachable places and operate in concert with numerous other devices, where the personnel and logistical costs of maintaining all batteries charged are unacceptably high. Harvesting energy, however, from light, heat, radiation, and motion is an attractive, though not easy alternative for replenishing small batteries and capacitors.

Although the application ultimately determines what energy source suits best, harvesting kinetic energy is promising because motion and vibrations are abundant and produce moderate power levels. For context, solar light generates more power, but only when exposed directly to the sun, and power densities derived from indoor lighting, thermal gradients, and radio-frequency (RF) waves fall well below their kinetic counterparts, although not all motion-based transducers perform equally well. Piezoelectric devices, in fact, when constrained to small platforms, generate more power than variable (electrostatic) capacitors and moving (electromagnetic) coils.

When considering a piezoelectric source, the internal charge configuration of the material changes (much like an ac current source) to generate an alternating voltage across the equivalent capacitance that its opposing surfaces present. The harvester circuit must therefore extract energy from the changing voltages of the piezoelectric capacitor and deposit charge into an energy-storage device. Because harvested power is low and uncorrelated to the load, a small battery or capacitor serves as the reservoir from which electrical functions in the system draw power on demand.

Conventional approaches first rectify the incoming ac voltage with a diode bridge. Some techniques reduce the voltage (and therefore power losses) across the pn-junction diodes by using MOS switches and driving them with a comparator that senses and ensures only small positive terminal voltages allow the switches to close. Unfortunately, input voltages must nonetheless exceed their rectified outputs for the MOS switches to conduct, which means rectifiers place a threshold limit on the mechanical input. In other words, rectified harvesters only harvest energy above a minimum input level, so they cannot extract all the energy the piezoelectric material offers. Although some systems extract more energy from the environment by boosting the transducer's electrical damping force with higher (LC-induced) piezoelectric voltages, the subsequent rectifier still suffers from a threshold minimum below which the harvester cannot harness energy. Furthermore, drawing maximum power requires an optimal rectified output voltage, so some approaches, at the cost of power, employ a correcting feedback loop that senses the harvester's output current to set the optimal rectified level.

Therefore, there is a need for an alternating current to direct current converter that does not incur the losses associated with a bridge rectifier.

SUMMARY OF THE INVENTION

The disadvantages of the prior art are overcome by the present invention which, in one aspect, is a circuit for harvesting electrical energy from a piezoelectric source and for storing the electrical energy in a battery that includes an inductor that is configured to store electrical energy. A diode bridge-free switching network is configured to: direct electrical energy from the piezoelectric source to the inductor during a first portion of a piezoelectric charge generating cycle; and direct electrical energy from the inductor to the battery during a second portion of the piezoelectric charge generating cycle.

In another aspect, the invention is a circuit for harvesting electrical energy that includes an alternating current source that is coupled between a first note and a second node. A load is coupled between a fifth node and the second node. An inductor, coupled between a third node and a fourth node, is configured to store electrical energy. A first switch is coupled between the first node and the third node. A second switch is coupled between the fourth node and the second node. A first unidirectional current directing device is coupled between the third node and the fifth node and is configured to allow current to flow only from the third node to the fifth node. A second unidirectional current directing device is coupled between the fourth node and the fifth node and is configured to allow current to flow only from the fourth node to the fifth node. A switch state controller is configured to control the first switch and the second switch. The switch state controller directs electrical energy from the alternating current source to the inductor during a first portion of an alternating current charge generating cycle and directs electrical energy from the inductor to the load during a second portion of the alternating current charge generating cycle.

In yet another aspect, the invention is a method of harvesting energy from a piezoelectric current generating source, in which an inductor is charged with a first bias during a first positive portion of a piezoelectric charge generating cycle from the piezoelectric current generating source. Current from the inductor is directed to a positive terminal of a load during a second positive portion of the piezoelectric charge generating cycle by coupling a first terminal of the inductor to the positive terminal of the load along a first circuit path. The inductor is charged with a second bias, opposite the first bias, during a first negative portion of the piezoelectric charge generating cycle from the piezoelectric current generating source. Current is directed from the inductor to the positive terminal of the load during a second negative portion of the piezoelectric charge generating cycle by coupling a second terminal of the inductor, different from the first terminal of the inductor, to the positive terminal of the load along a second circuit path, different from the first circuit path.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
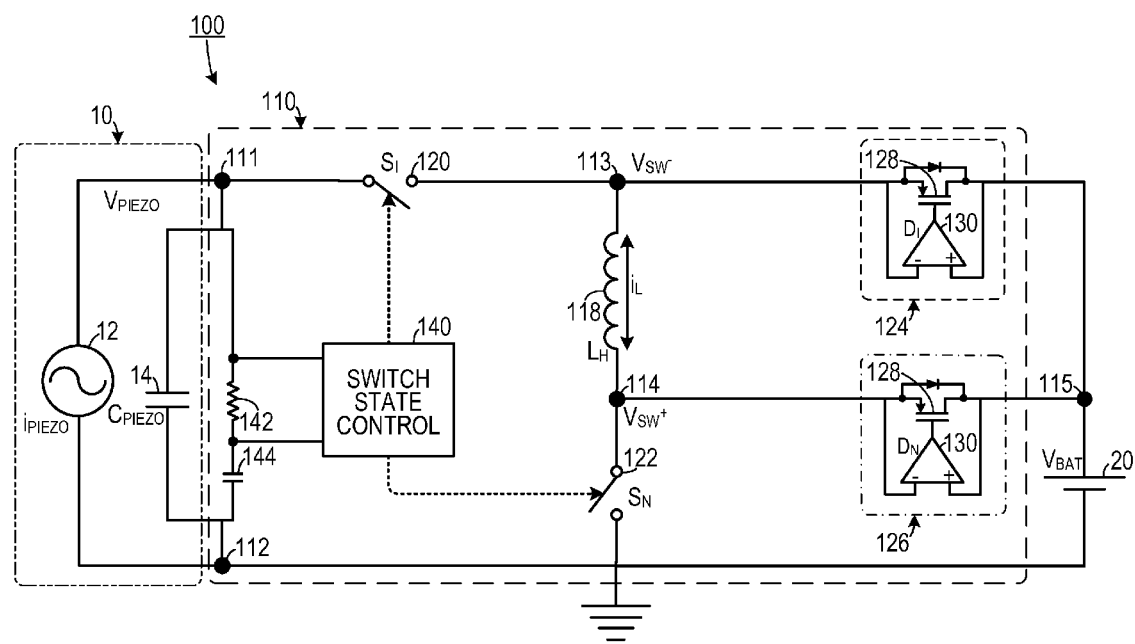
FIG. 1 is a schematic diagram showing one embodiment of an alternating current to direct current conversion circuit.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of a circuit 100 for harvesting electrical energy from a piezoelectric source 10 (which can include a piezoelectric structure 12 and an inherent capacitance 14), or other type of alternating current source, and for storing the electrical energy in a battery 20, or other type of load, includes an inductor 118 that stores electrical energy from the piezoelectric source 10. A diode bridge-free switching network 110 directs electrical energy from the piezoelectric source 12 to the inductor 118 during a first portion of a piezoelectric charge generating cycle (such a as a period between when the piezoelectric source 10 begins either a positive (or negative) voltage cycle and when it reaches a maximum (or minimum) voltage peak) and directs electrical energy from the inductor 118 to the battery 20 during a second portion (e.g., after a voltage peak) of the piezoelectric charge generating cycle.

The piezoelectric source 10 is coupled between a first node 111 and a second node 112, the inductor 118 is coupled between a third node 113 and a fourth node 114, and the battery 20 is coupled between a fifth node 115 and the second node 112. The switching network includes: a first switch 120 coupled between the first node 111 and the third node 113; a second switch 122 coupled between the fourth node 114 and the second node 112. A first unidirectional current directing device 124 coupled between the third node 113 and the fifth node 115. The first unidirectional current directing device 124 allows current to flow only from the third node 113 to the fifth node 115. Similarly, a second unidirectional current directing device 126 is coupled between the fourth node 114 and the fifth node 115. The second unidirectional current directing device 126 allows current to flow only from the fourth node 114 to the fifth node 115.

In one embodiment, both the first unidirectional current directing device 124 and the second unidirectional current directing device 126 each include a transistor 128 having a source, a drain and a gate. A comparator 130 compares the voltage at the source to the voltage at the drain and drives the gate so as to put the transistor 128 in a conducting state when current is flowing into the source side of the transistor 128. A driver element (such as a plurality of cascaded inverters, shown in FIG. 6) may be disposed between the output of the comparator and the gate of the transistor.

A switch state controller 140, which is coupled to the piezoelectric source 10 via a resistor 142 and a series capacitor 144 (also, the addition of a parallel capacitor might be necessary if the inherent capacitance 14 of the piezoelectric source is insufficient), controls the states of the first switch 120 and the second switch 122, based on a voltage sensed at the piezoelectric source 10.

Figure 2A:
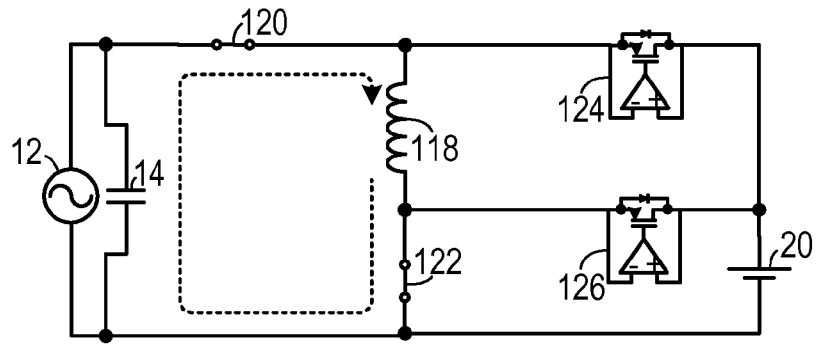
FIGS. 2A-2D are a series of schematic diagrams showing current paths in the circuit shown in FIG. 1.
Figure 2B:
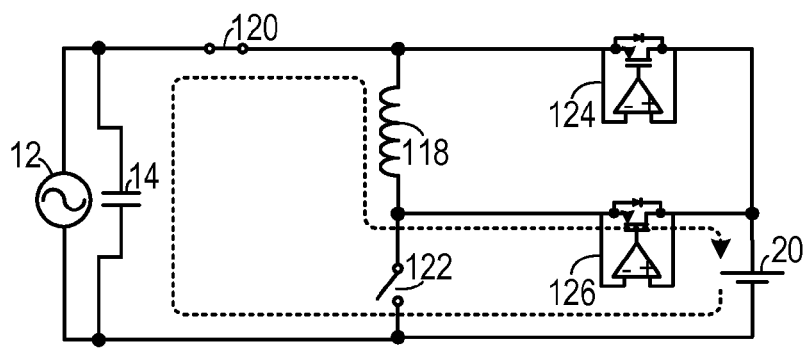
Figure 2C:
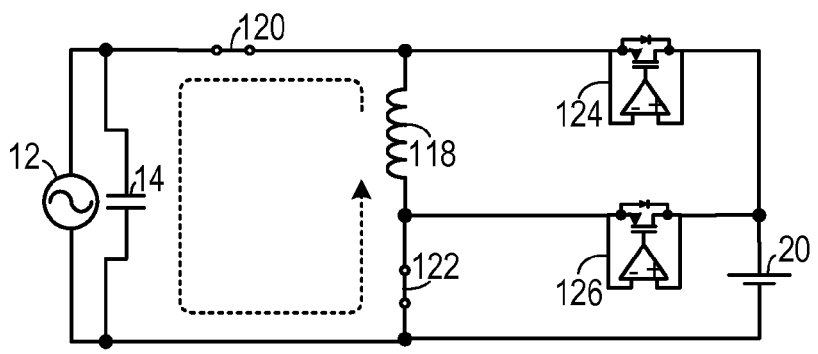
Figure 2D:
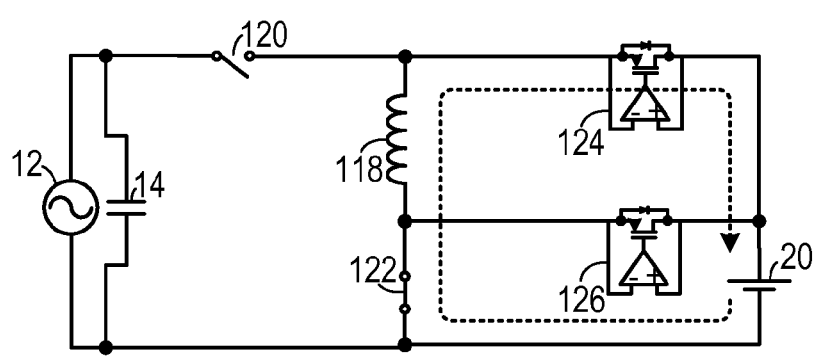
Figure 3A:
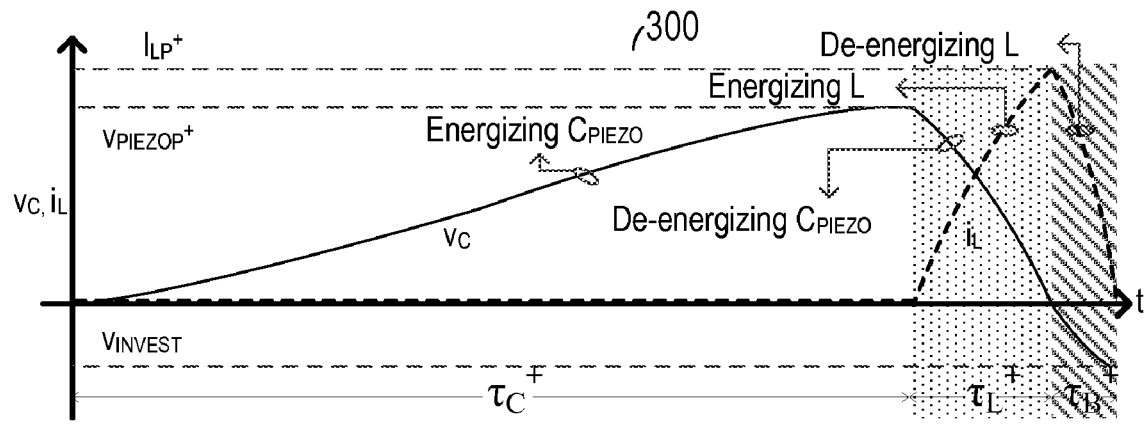
FIGS. 3A-3B are two graphs showing electrical characteristics of the circuit shown in FIG. 1 in relation to time.
Figure 3B:
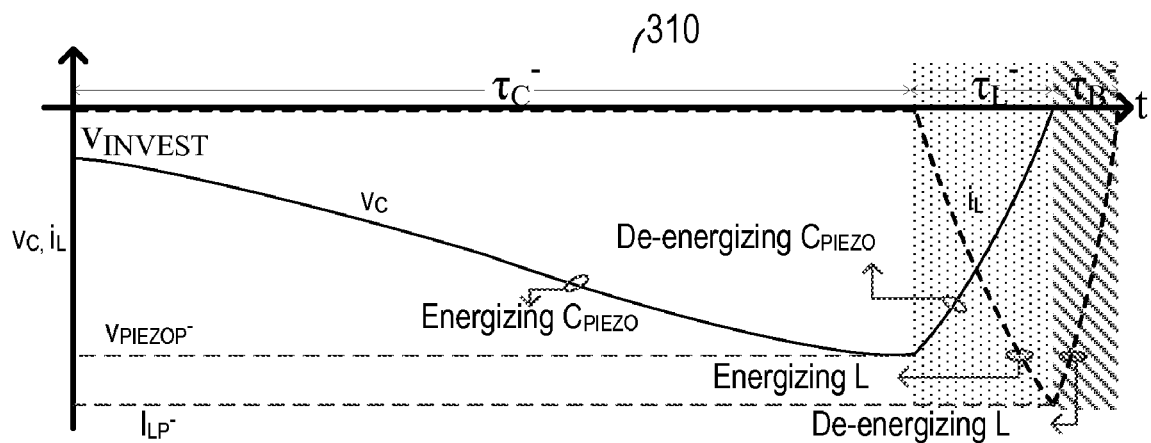

Both the first switch 120 and the second switch 122 are closed during a first portion of a positive current generating portion of the piezoelectric charge generating cycle, as shown in FIG. 2A, during which time the inductor 118 is charged. Then the first switch 120 is maintained in a closed state and the second switch 122 is opened during a second portion of the positive current generating portion of the piezoelectric charge generating cycle. At the beginning of a first portion of a negative current generating portion of the piezoelectric charge generating cycle, as shown in FIG. 2C, both the first switch 120 and the second switch 122 are again closed, thereby charging the inductor 118 with a polarity opposite of the polarity it was charged in FIG. 2A. Then, as shown in FIG. 2D, the first switch 120 is opened and the second switch 122 is maintained in a closed state during a second portion of the negative current generating portion of the piezoelectric charge generating cycle, thereby allowing current to flow from the inductor 118 into the battery. As shown in the graph 300 in FIG. 3A, both switches 120 and 122 are closed in $\tau_L^+$ during which the inductor 118 is charged from the piezoelectric source 10. Then the first switch 120 is maintained in a closed state and the second switch 122 is opened during $\tau_B^+$ to allow the inductor to charge the battery. As shown in the graph 310 in FIG. 3B, both switches 120 and 122 are closed during $\tau_L^-$, thereby charging the inductor 118 with a polarity opposite of the polarity it was charged in the positive cycle. Then, the first switch 120 is opened and the second switch 122 is maintained in a closed state during $\tau_B^-$ to allow the current to flow from the inductor 118 into the battery 20.

Figure 4:
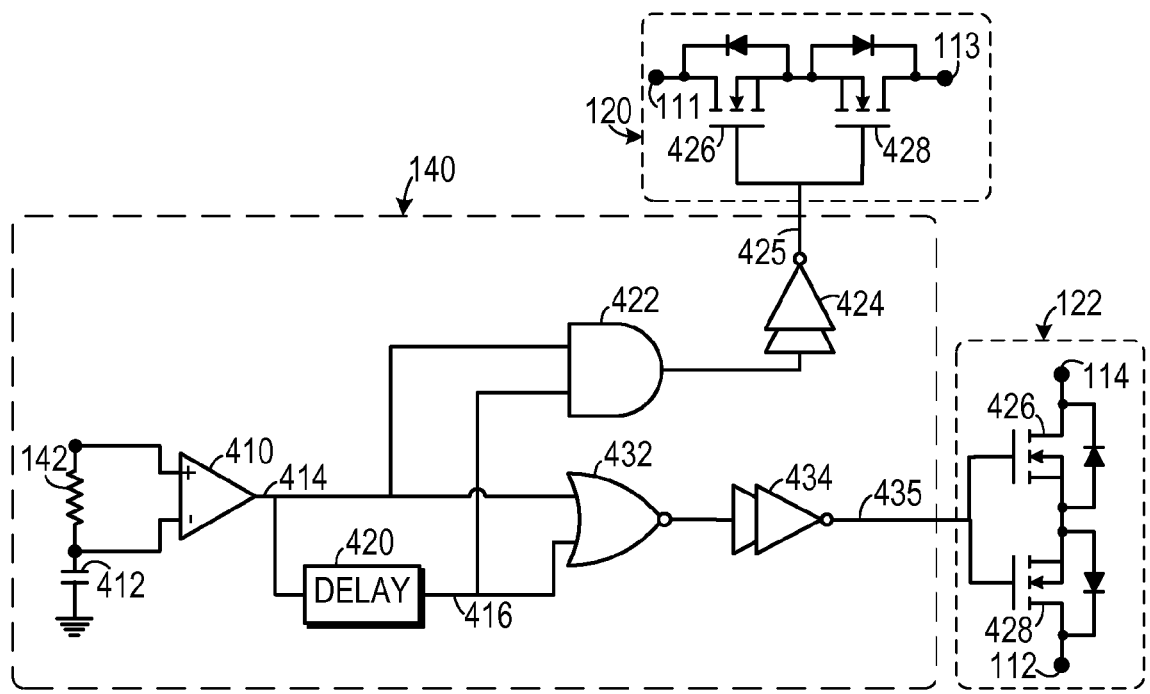
FIG. 4 is a schematic diagram showing one embodiment of a switch state control circuit.
Figure 5:
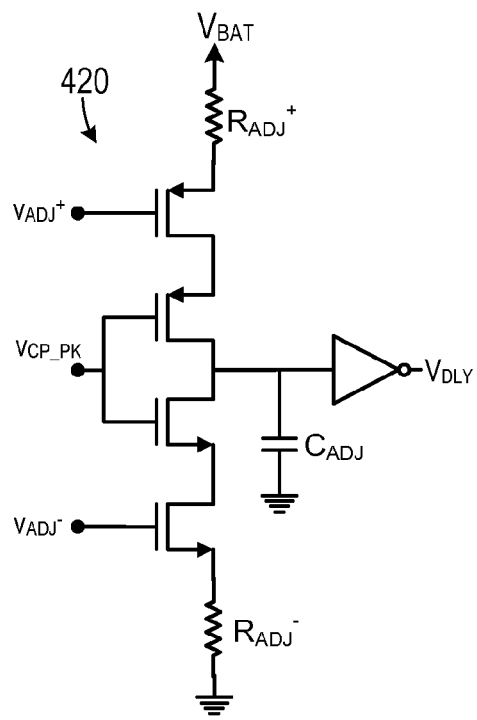
FIG. 5 is a schematic diagram showing one embodiment of a delay circuit.

As shown in FIG. 4, one embodiment of the switch state controller 140 includes a comparator 410 coupled across resistor 142 and decoupled from a ground via capacitor 412. The comparator 410 detects the positive and negative voltage events across resistor 142 and generates an output 414 representative thereof, which is fed into a delay circuit 420 (one embodiment of which is shown in FIG. 5). The comparator output 414 and the delay output 416 are fed into both an AND gate 422 and a NOR gate 432. A first driver element 424, which includes a plurality of cascaded inverters, repowers the output from the AND gate 422 to generate a first switch control signal 425 that drives the first switch 120. Similarly, a second driver element 434, which includes a second plurality of cascaded inverters, repowers the output from NOR gate 432 to generate a second switch control signal 435 that drives the second switch 122. The first switch 120 and the second switch 122 each include a first transistor 426 and a second transistor 428, whose gates are coupled to each other. The first transistor 426 has a leakage current that flows in a first direction and the second transistor 428 has a leakage current that flows in a second direction that is opposite of the first direction.

Figure 6:
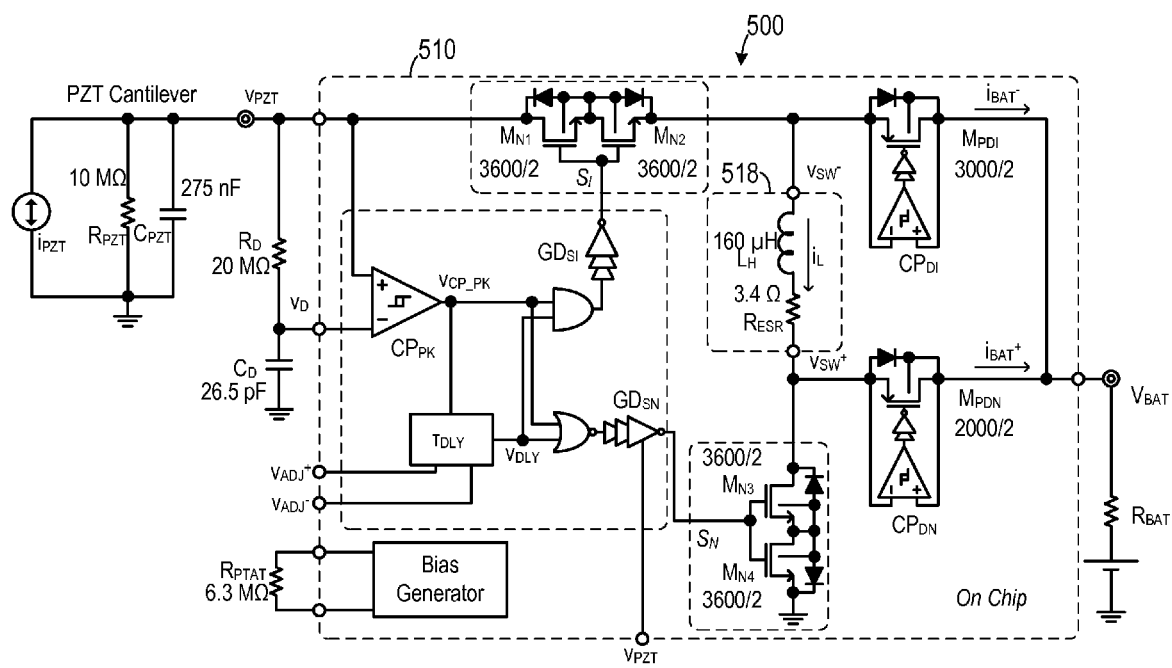
FIG. 6 is a schematic diagram showing one embodiment of one experimental embodiment of a piezoelectric energy harvesting system.

One experimental embodiment 500 is shown in FIG. 6. In this embodiment 500, most of the components of the diode bridge-free switching network 510, except for the inductor 518, can be embodied on a single chip.

In this experimental embodiment, when vibrations move the piezoelectric cantilever in the positive cycle, the system waits until the voltage across piezoelectric capacitance $C_{PZT}$ peaks, which happens when the transducer's cantilever reaches its maximum displacement. At this point, the system energizes harvesting inductor $L_H$ from $C_{PZT}$ in energizing time $\tau_L^+$ and then de-energizes $L_H$ into the battery in de-energizing time $\tau_B^+$. Transferring energy this way only requires a few microseconds, which represents a negligible fraction of the millisecond vibration period, so the position of the transducer is, for all practical purposes, static during the transfer. Similarly, after depositing positive-cycle charge into the battery, the system waits until the piezoelectric device charges $C_{PZT}$ in the negative direction to its negative peak. The switched-inductor circuit then quickly energizes and de-energizes $L_H$ in $\tau_L^-$ and $\tau_B^-$ from $C_{PZT}$ to the battery. This negative-cycle transfer concludes the full cycle, and the sequence repeats as long as vibrations persist.

$C_{PZT}$ stores the energy that the piezoelectric material produces each half cycle ($E_{IN}^+$) and the switched-inductor converter extracts $E_{IN}^+$ from $C_{PZT}$ to reset $C_{PZT}$'s voltage $v_{PZT}$ to 0 V. Assuming piezoelectric current $i_{PZT}$ is sinusoidal at $I_{PZT} \sin(\omega_{VIB}t)$, $v_{PZT}$ rises in positive-cycle time $\tau_C^+$ to $$v_{PZT}(t) = \frac{1}{C_{PZT}} \int_0^\tau i_{PZT}(\tau)d\tau = \left(\frac{I_{PZT}}{\omega_{VIB}C_{PZT}}\right)[1 - \cos(\omega_{VIB}t)]$$

After $\tau_C^+$, $C_{PZT}$ accumulates $$E_{IN}^+ \approx \int_0^{\tau_C^+ \approx T/2} i_{PZT}(t)v_{PZT}(t)dt = \frac{2I_{PZT}^2}{\omega_{VIB}^2 C_{PZT}}$$

Since the negative cycle generates an equivalent amount (i.e., $E_{IN}^+ \approx E_{IN}^-$), the system harnesses $4I_{PZT}^2/\omega_{VIB}^2 C_{PZT}$ from each vibration period, which is four times (4×) more energy than the ideal diode-rectified case can possibly induce.

In the positive cycle, with switch $S_I$ open, the switched-inductor power stage waits for $i_{PZT}$ to charge $C_{PZT}$ to peak positive voltage $V_{PIEZOP}^+$. $V_{PIEZOP}^+$ is not the actual peak because the implemented circuit includes delay and offset, the causes and implications of which subsequent subsections will address. The controller then closes $S_I$ and $S_N$ to discharge $C_{PZT}$ into $L_H$ for energizing time $\tau_L^+$, allowing $L_H$'s current $i_L$ to reach positive peak current $I_{LP}^+$. Because a capacitor fully discharges into an inductor in a quarter of its LC resonance period, the system sets $\tau_L^+$ to one-fourth of $2\pi\sqrt{(L_H C_{PZT})}$. After $\tau_L^+$, $S_N$ opens and $i_L$ charges the parasitic capacitance at $v_{SW}^+$ until non-inverting diode $D_N$ forward biases and steers $i_L$'s de-energizing (battery) current $i_{BAT}^+$ into the battery. Once $D_N$ completely drains $L_H$, after de-energizing time $\tau_B^+$, $D_N$ opens automatically (i.e., asynchronously).

The negative cycle operates similarly, except the power stage inverts its functionality to realize an inverting buck-boost translation. As such, the system waits for $i_{PZT}$ to charge $C_{PZT}$ in the negative direction until $v_{PZT}$ reaches negative peak voltage $V_{PIEZOP}^-$. (Like before, $V_{PIEZOP}^-$ is not accurate because of non-idealities in the circuit.) $S_I$ and $S_N$ then drain $C_{PZT}$ into $L_H$ for one-fourth of $L_H$-$C_{PZT}$'s resonance period, after which point $S_I$ opens and $i_L$ charges $v_{SW}^-$'s parasitic capacitance until inverting diode $D_I$ forward biases and conducts $i_L$'s de-energizing (battery) current $i_{BAT}^-$ into the battery.

Unlike many rectified harvesters, this embodiment of a switched-inductor circuit can de-energize (and therefore harness) all piezoelectric energy in $C_{PZT}$, which is to say the circuit does not suffer from a minimum input threshold. What is more, $L_H$ automatically raises $v_{SW}^+$ and $v_{SW}^-$ to whatever voltage the battery demands, which means the circuit does not require the additional dc-dc converter stage that use to drive charge into the battery. Unlike some other converters, which include a lossy feedback loop to adjust the rectifier output voltage to draw the maximum power from $C_{PZT}$, embodiments of the present invention can derive four times (4×) more energy than rectified harvesters without a correcting loop.

An integrated circuit version of this embodiment integrates the switches, controller, and bias generator into a single 2-μm BiCMOS IC. Bias resistor $R_{PTAT}$ and delay filter elements $R_D$ and $C_D$ are off chip for testing flexibility. For the same reasons, external voltages $V_{ADJ}^+$ and $v_{ADJ}^-$ adjust energizing times $\tau_L^+$ and $\tau_L^-$ externally. The piezoelectric cantilever, the battery, and $L_H$ are also off chip.

A series combination of two NMOS transistors in an isolated p-well implements both $S_I$ and $S_N$. The purpose of the back-to-back body diodes is to block the undesired diode current that would otherwise result through the body diode of a single transistor when $v_{PZT}$ swings below ground (in the negative cycle) or above battery voltage $V_{BAT}$ (in the positive cycle). Note that the series combination of two switches increases channel resistance and gate capacitance, which raise conduction and switching losses, respectively, but not to the extent body-diode conduction would dissipate power.

Allowing $v_{PZT}$ to swing below ground demands that $S_N$'s gate driver $GD_{SN}$ outputs a negative voltage. The reason for this is that, while $S_N$ is open during the negative cycle, when $v_{PZT}$ falls below ground, $S_I$ remains closed and, as a result, switch-node voltages $v_{SW}^+$ and $v_{SW}^-$ follow $v_{PZT}$ below ground. During this time, driving $S_N$'s gate to zero would not disengage $S_N$. To avoid this problem, $GD_{SN}$'s last inverter stage connects to $v_{PZT}$ instead of ground. Accordingly, $GD_{SN}$'s output $v_{GDSN\_OUT}$ follows $v_{PZT}$ during the negative cycle and nears $V_{BAT}$ otherwise. Because $S_N$'s gate capacitance is orders of magnitude below $C_{PZT}$'s, $GD_{SN}$ hardly drains $C_{PZT}$, that is, has negligible impact on $v_{PZT}$.

To reduce the diode-voltage conduction loss across battery-charging diodes $D_N$ and $D_I$ in the power stage, the circuit replaces them with low-drop synchronous MOS switches $M_{PDN}$ and $M_{PDI}$. Here, comparators $CP_{DN}$ and $CP_{DI}$ sense when $D_N$ and $D_P$'s anode (switching) voltages $v_{SW}^+$ and $v_{SW}^-$ just surpass their cathode counterpart $V_{BAT}$ to engage $M_{PDN}$ and $M_{PDI}$, and switch them off otherwise. $CP_{DN}$ and $CP_{DI}$ must therefore (i) respond quickly (to reduce the time the lossy body-diodes conduct charging currents and keep $M_{PDN}$ and $M_{PDI}$ from draining the battery with negative current) and (ii) and dissipate little energy.

A fast response implies considerable quiescent current and low energy means the comparators must operate only when needed (asynchronously): when $L_H$ drains $i_L$ into the battery (during $\tau_B^+$ and $\tau_B^-$). Fortunately, $\tau_B^+$ and $\tau_B^-$ are a small fraction of the vibration period so energy remains low (at 0.5 nJ per cycle in the prototyped case). Considering that, the comparator powers only when $i_L$ is non-zero and the corresponding switching (anode) voltage $v_{SW}$ is well above zero (above $M_{PB}$ and $M_{NB}$'s combined gate-source voltages), which only happens when $L_H$ is ready to charge the battery. During that time, some of $i_L$ (as limited by $R_{BIAS}$) flows into bias mirror $M_{NB}$-$M_{NO}$ to establish a threshold current about which $M_{PO}$ determines the state of the comparator. That way, since $M_{PB}$ and $M_{PO}$ match, $M_{PO}$ conducts less current and engages $M_{PDN}$ (or $M_{PDI}$) when $V_{BAT}$ is below $v_{SW}$, and vice versa otherwise.

Because the comparator does not draw current until $v_{SW}$ rises well above ground, $i_L$ charges $v_{SW}$'s parasitic capacitance $C_{SW\_PAR}$ quickly and $M_{NO}$ sinks sufficient current to ensure $V_{CP\_OUT}$ transitions low quickly (to engage $M_{PDN}$ or $M_{PDI}$). Note $M_{PDN}$'s (or $M_{PDI}$'s) body diode conducts current while the comparator reacts to close $M_{PDN}$ (or $M_{PDI}$). Once engaged, $v_{SW}$ remains above $V_{BAT}$ by the Ohmic voltage $i_L$ produces across $M_{PDN}$'s (or $M_{PDI}$'s) series resistance. As a result, $v_{SW}$ decreases with $L_H$'s falling $i_L$, as $L_H$ de-energizes. When $i_L$ reaches zero, which happens when the system exhausts $L_H$'s energy, $v_{SW}$ falls to $V_{BAT}$ and the comparator transitions to disengage $M_{PDN}$ (or $M_{PDI}$). Because $i_L$ no longer carries sufficient current to power the comparator, the circuit shuts down automatically.

During the turn-off transition, the comparator receives a small overdrive voltage so its shut-off time is longer than its counterpart is. As a result, while still closed, $M_{PDN}$'s (or $M_{PDI}$'s) reverse current can not only discharge the battery but also dissipate power. To prevent this reverse current, the comparator shifts the shut-off trip-point up to transition earlier (when $v_{SW}$ is slightly above $V_{BAT}$) by leaking current away from $M_{NB}$ through $M_{NH1}$. The positive feedback that $M_{NH1}$ creates engages only after $V_{CP\_OUT}$ rises above ground by more than $M_{NH1}$'s $V_{TN}$, which happens after the comparator decides to raise $V_{CP\_OUT}$. In other words, $M_{NH1}$ accelerates the circuit only after it begins to trip. $M_{NH1}$ also imbalances gate-coupled pair $M_{PB}$-$M_{PO}$ with $M_{NH2}$'s current to offset $v_{SW}$'s rising trip-point (and create a hysteresis) that helps in preventing transient and ringing events in $v_{SW}$ from asserting inadvertent transitions in the comparator.

The purpose of the control block is to determine when to start and stop energizing $L_H$. First, $S_I$ and $S_N$ should start discharging $C_{PZT}$ into $L_H$ when $v_{PZT}$ peaks. To this end, comparator $CP_{PK}$ compares $v_{PZT}$ with a delayed version of itself ($v_D$) to capture the moments when $v_{PZT}$ stops leading $v_D$. That is to say, $v_{PZT}$ drops below $v_D$ when $v_{PZT}$ just begins falling from its positive peak and $v_{PZT}$ rises above $v_D$ when $v_{PZT}$ just begins increasing from its negative peak.

$CP_{PK}$ incorporates about ±10 mV of hysteresis to deglitch noise in $v_{PZT}$ and $v_D$. The cross-coupled, positive-feedback p-type mirror load unbalances the n-type differential pair in both directions for that purpose. The circuit operates in sub-threshold to minimize power (with nano-amps) so its delay is on the microsecond range. Such a slow response is tolerable because microseconds constitute a negligible fraction of the millisecond vibration period, meaning $v_{PZT}$ does not change appreciably in microseconds. To mitigate risk in evaluating the power stage and its basic control scheme, external negative source $V_{SS}$ extends $CP_{PK}$'s input common-mode range (ICMR) below ground so it can accommodate negative $v_{PZT}$ voltages.

Ideally, the harvester should stop energizing $L_H$ after one-fourth of $L_H$-$C_{PZT}$'s resonance period, after energizing periods $\tau_L^+$ and $\tau_L^-$. For that, $v_{ADJ}^+$-$R_{ADJ}^+$ and $v_{ADJ}^-$-$R_{ADJ}^-$ set the source and sink currents that charge and discharge $C_{ADJ}$ so that $C_{ADJ}$'s voltage reaches the threshold of the ensuing inverter in $\frac{1}{2}\pi\sqrt{(L_H C_{PZT})}$. Since tolerance in $R_{ADJ}$ and $C_{ADJ}$ offset this time, and other parasitic effects similarly shift how long $C_{PZT}$ should discharge into $L_H$, $v_{ADJ}^+$ and $v_{ADJ}^-$ are adjustable (and off chip for testing flexibility).

After discounting losses, the system harnesses up to 30 μW ($P_H$) from 72 μW of transducer-generated power ($P_{IN(LOADED)}$). Without the harvester (i.e., unloaded) and under equal mechanical stimulation, energy per cycle in $C_{PZT}$ (i.e., $C_{PZT} \Delta v_{PZT(UNLOADED)}^2 f_{VIB}$) can generate less power ($P_{IN(UNLOADED)}$) than when loaded (e.g., 40 versus 72 μW). This results, as expected, because extracting all $C_{PZT}$'S positive- and negative-cycle energy resets (i.e., conditions) $v_{PZT}$ to zero, further increasing the transducer's electrical damping force and thereby inducing it to derive more energy from the environment. Note $P_{IN(UNLOADED)}$ also represents the maximum input power a rectifier-based circuit can produce because a rectifier draws charge from $C_{PZT}$ without conditioning its voltage. In other words, the best possible (and ideal) rectifier-based system would draw roughly 56% of what this embodiment can (e.g., 40 of 72 μW).

Although increasing the transducer's output power by up to 78% or 1.78× (when $\Delta v_{PZT(UNLOADED)}$ is 1.2 V) by loading it with the prototyped harvester corroborates theory, which predicts a 4× (i.e., 400%) improvement. One reason for this discrepancy is $CP_{PK}$'s 36-mV input-referred offset causes the system to discharge $C_{PZT}$ past $v_{PZT}$'s peak after $C_{PZT}$ loses some energy to vibrations. What is more, since the offset voltage does not scale with the input, the fraction of energy lost to vibrations is larger for smaller inputs, so loaded-to-unloaded input-power ratio $P_{IN(LOADED)}/P_{IN(UNLOADED)}$ decreases from 1.78 rapidly (i.e., nonlinearly) with respect to $\Delta v_{PZT(UNLOADED)}$. Parasitic resistances in switches $S_N$ and $S_I$ and across $L_H$ also reduce the transducer's output power because, instead of fully draining $C_{PZT}$ into $L_H$ by lowering $v_{PZT}$ to zero, the converter pulls $v_{PZT}$ to the voltage drop across $S_N$, $L_H$, and $S_I$'s combined series resistance $R_{SN}+R_{ESR}$ $R_{SI}$. This non-zero voltage not only represents remnant energy that the system does not harvest but also lowers the peak amplitude (i.e., electrical damping force) of the ensuing half cycle.

Ultimately, the harvesting conversion efficiency of the system with respect to $P_{IN(LOADED)}$ across vibration strength falls between 40% and 50%. The system loses conduction energy $E_C$ to the switches' finite resistances and $L_H$'s equivalent-series resistance (ESR) when $i_L$ flows through $L_H$ during $L_H$'s positive- and negative-cycle energizing and de-energizing times $\tau_L^+$, $\tau_B^+$, $\tau_L^-$, and $\tau_B^-$. However, $L_H$ de-energizes in considerably less time than it energizes (i.e., $\tau_L^+$ and $\tau_L^-$ are considerably longer than $\tau_B^+$ and $\tau_B^-$) so $E_C$ mostly consists of energizing losses:

$$E_C \approx E_{C(LE)} \approx \left[\left(\frac{I_{LP}^+}{\sqrt{3}}\right)^2 + \left(\frac{I_{LP}^-}{\sqrt{3}}\right)^2\right](R_{SI} + R_{SN} + R_{ESR})\tau_{LE}$$

where energizing times $\tau_L^+$ and $\tau_L^-$ equal (to $\tau_{LE}$) and $I_{LP}^+/\sqrt{3}$ and $I_{LP}^-/\sqrt{3}$ are the root-mean-squared (RMS) currents flowing through the resistors across $\tau_L^+$ and $\tau_L^-$, respectively. $E_C$ falls with increasing $L_H$ values because, even though $\tau_{LE}$ increases with $L_H^{0.5}$ (from $\frac{1}{2}\pi\sqrt{(L_H C_{PZT})}$), $(I_{LP}^+)^2$ and $(I_{LP}^-)^2$ decrease with $L_H^{-1}$. Wider MOS transistors (i.e., lower $R_{SI}$ and $R_{SN}$) also decrease $E_C$, but at the expense of silicon real estate and higher switching gate-drive losses $E_{SW(GD)}$, as the following discussion will elucidate.

The system loses $E_{SW(GD)}$ in inverter drivers when they charge and discharge parasitic gate capacitances in $S_I$, $S_N$, and $D_N$ and $D_I$'s $M_{PDN}$ and $M_{PDI}$. Since all the switches in this embodiment engage and disengage once per cycle, gate-drive losses amount to $$E_{SW(GD)} \approx (C_{SI} + C_{DI} + C_{DN})V_{DD}^2 + C_{SN}(V_{DD} + |V_{PIEZOP}^-|)^2$$

where $C_{SI}$, $C_{DI}$, $C_{DN}$, and $C_{SN}$ refer to the parasitic capacitances that $S_I$, $D_I$'s $M_{PDI}$, $D_N$'s $M_{PDN}$, and $S_N$ introduce, respectively, which scale with transistor channel widths. Note $S_N$ causes more energy loss than other switches because its gate swings between $V_{DD}$ and $V_{PIEZOP}^-$.

The system also loses overlap losses $E_{SW(IV)}$ when MOS drain currents and drain-source voltages shortly overlap every time they transition. This overlap occurs when $S_N$ and $S_I$ open because $v_{SW}^+$ and $v_{SW}^-$ transition with a non-zero $i_L$:

$$E_{SW(IV)} \approx (0.5I_{LP}^+\tau_{SN\_OFF} + 0.5I_{LP}^-\tau_{SI\_OFF})(V_{BAT} + V_D)$$

where $V_D$ refers to $M_{PDN}$ and $M_{PDI}$'s as body-diode voltage. Here, because $i_L$ is triangular and $\tau_{SN\_OFF}$ and $\tau_{SI\_OFF}$ are $S_N$ and $S_I$'s corresponding off times, $0.5I_{LP}^+\tau_{SN\_OFF}$ and $0.5I_{LP}^-$ $\tau_{SI\_OFF}$ represent $S_N$ and $S_I$'s total conducted charge during transitions.

Peak-detector comparator $CP_{PK}$, the nanoamp-bias generator, adjustable delay block $\tau_{ADJ}$, the logic gates, and $D_N$ and $D_I$'s comparators $CP_{DN}$ and $CP_{DI}$ also dissipate quiescent energy ($E_Q$). The losses in $CP_{PK}$ and the bias circuit, however, dominate $E_Q$ because they operate through the entire vibration cycle, whereas the other circuits only engage for a substantially smaller fraction. Overall, although higher input power increases $|V_{PIEZOP}^-|$, $I_{LP}^+$, and $I_{LP}^-$ and their associated switching losses $E_{SW(GD)}$ and $E_{SW(IV)}$, conduction losses $E_C$ scales more rapidly with power (i.e., proportional to $(I_{LP}^+)^2$ and $(I_{LP}^-)^2$) so $E_C$ ultimately dominates and limits $\eta_H$ when mechanical vibrations are strong. Conversely, when vibrations are weak, $E_Q$ may dominate because $E_C$, $E_{SW(GD)}$, and $E_{SW(IV)}$ scale with power.

Vibrations in practical operating environments occur, for the most part, at relatively low frequencies, between maybe 1 Hz for a person walking to 167 Hz for an engine cycling at 10,000 revolutions per minute. What is more, the rate is often inconsistent and maybe even non-recurring, as in the case of human motion, wind-propelled movements, and vibrations generated from impact. What all this means is that matching the narrow band of a transducer to vibrations, which is the recipe for high conversion efficiency, is oftentimes impractical and unrealistic.

Because the prototyped harvester automatically detects when to draw energy from $C_{PZT}$, the system is capable of harnessing energy from non-periodic stimuli. When dropping a 145-g official major-league baseball from 40 cm above the experimental setup table, for example, the impact of the ball bouncing once off the table induces the piezoelectric cantilever to vibrate and produce the pulse train. In this case, the prototyped system charged 500 nF (from 3.04 V) from a single bounce for three separate trials by roughly 200 mV.

Each drop produces the decaying vibrations where the system harvests energy by quickly draining $C_{PZT}$ into $L_H$ and then $L_H$ into the 500-nF capacitor each time $v_{PZT}$ peaks. As $v_{PZT}$'s peaks (and mechanical strength) decrease, however, peak-detector comparator $CP_{PK}$'s offset has a larger impact on how much input power $P_{IN(LOADED)}$ the system harnesses so output power $P_H$ decreases more than basic theory predicts. Under these weak vibrations, in fact, $R_D$-$C_D$ and $CP_{PK}$'s delays increase $CP_{PK}$'s offset to degrade performance. In contrast, just as $CP_{PK}$'s offset adds to the effects of $CP_{PK}$'s delay in the positive half-cycle, the offset cancels delay in the negative half-cycle which means alternating the polarity of the offset can improve overall performance.

Although the immediate aim of this research is to raise $P_H$ by increasing $\eta_H$ and $P_{IN(LOADED)}$, the ultimate metric is end-to-end harvesting conversion efficiency $\eta_{TOTAL}$, which refers to how much mechanical energy $E_{ME}$ reaches the output as harvested energy $E_H$. A means of applying a known value for $E_{ME}$ (and approximating $\eta_{TOTAL}$) is to tie an object of known mass $m_W$ to the tip of the piezoelectric cantilever with a light string and subsequently cut the link. Since the cantilever's elastic force $F_C$ balances the object's gravitational pull $F_G$, $E_{ME}$ relates to $F_G$ and the cantilever's tip displacement distance $d_C$:

$$E_{ME} = \frac{K_C d_C^2}{2} = \frac{(K_C d_C) d_C}{2} = \frac{F_C d_C}{2} = \frac{F_G d_C}{2} = \frac{(m_W g) d_C}{2}$$

where $K_C$ and g refer to the spring constant and gravity's acceleration, respectively.

This way, neglecting parasitic weights and assuming the string severs instantaneously, the prototyped harvester charged (experimentally) 500 nF by roughly 400 mV from a 3-g weight. As a result, subtracting the external supply's quiescent energy $E_Q$ (to the chip for $CP_{PK}$, bias generator, adjustable delay, and logic gates) and gate-driving losses $E_{SW(GD)}$ from the energy deposited in the 500-nF capacitor reduces $E_H$ to $$E_H = 0.5 C_{BAT}(V_{BAT(F)}^2 - V_{BAT(i)}^2) - E_Q - E_{SW(GD)}$$

which ranged between 100 and 660 nJ when stimulated with 1.2 to 10.8 µJ of $E_{ME}$ from 1-, 2-, and 3-g weights to yield 6.1±1.5% to 8.8±6.9% of $\eta_{TOTAL}$ or $E_H/E_{ME}$.

$\eta_{TOTAL}$ incorporates the collective performance of the transducer ($\eta_{PZT(LOADED)}$) and the harvester ($\eta_H$), which means $\eta_{PZT(LOADED)}$ is $\eta_{TOTAL}/\eta_H$ or roughly 14%-20% when assuming $\eta_H$ is 45% on average. Since $\eta_{PZT(LOADED)}$ includes a factor improvement the harvester induces, the unloaded counterpart ($\eta_{PZT(UNLOADED)}$) is less than 14%-20% by up to 1.78×. Although this simple analysis is by no means accurate or complete, it shows that mechanical losses are significant at around 80% and conditioning the transducer to increase $P_{IN(LOADED)}$ is as important as reducing the losses across the switched-inductor converter (i.e., increasing $\eta_H$).

The embodiment of a 2-µm BiCMOS switched-inductor piezoelectric harvester generates and steers up to 30 µW from a periodic 72-µW piezoelectric source into a capacitor or battery directly. In doing so, it increases the piezoelectric cantilever's electrical damping force to raise the transducer's (and therefore system's end-to-end) mechanical-electrical efficiency by up to 78%. The system also harnesses up to 659 nJ from non-periodic vibrations with 6.1±1.5% to 8.8±6.9% end-to-end mechanical-electrical efficiencies. One key feature of the presented harvester is that it eliminates the need for a rectifier. As a result, the system no longer (i) places a threshold limit imposed by diodes and/or the output voltage on mechanical vibrations, (ii) loses power across an otherwise additional stage (i.e., across a rectifier), and (iii) limits how much the circuit dampens the transducer (to produce more power). Conditioning the piezoelectric device to generate more power is an important attribute, as is the relatively simple and low-loss control strategy the system adopts to energize and de-energize the inductor directly into the energy-storage device. From a practical standpoint, the harvester is also able to harness energy from short, non-periodic mechanical vibrations, which are more prevalent in real-life applications, such as in human motion, wind-propelled movements, vibrations that objects crashing produce, and so on.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A circuit for harvesting electrical energy from a piezoelectric source and for storing the electrical energy in a battery, comprising:
    (a) an inductor configured to store electrical energy; and
    (b) a diode bridge-free switching network that is configured to:
        (i) direct electrical energy from the piezoelectric source to the inductor during a first portion of a piezoelectric charge generating cycle; and
        (ii) direct electrical energy from the inductor to the battery during a second portion of the piezoelectric charge generating cycle.

2. The circuit of claim 1, wherein the piezoelectric source is coupled between a first node and a second node, the inductor is coupled between a third node and a fourth node, and the battery is coupled between a fifth node and the second node, and wherein the switching network comprises:
    (a) a first switch coupled between the first node and the third node;
    (b) a second switch coupled between the fourth node and the second node;
    (c) a first unidirectional current directing device coupled between the third node and the fifth node and configured to allow current to flow only from the third node to the fifth node;
    (d) a second unidirectional current directing device coupled between the fourth node and the fifth node and configured to allow current to flow only from the fourth node to the fifth node; and
    (e) a switch state controller that is configured to control the first switch and the second switch.

3. The circuit of claim 2, wherein the switch state controller is configured to:
    (a) close both the first switch and the second switch during a first portion of a positive current generating portion of the piezoelectric charge generating cycle;
    (b) maintain the first switch in a closed state and open the second switch during a second portion of the positive current generating portion of the piezoelectric charge generating cycle;
    (c) close both the first switch and the second switch during a first portion of a negative current generating portion of the piezoelectric charge generating cycle; and
    (d) open the first switch and maintain the second switch in a closed state during a second portion of the negative current generating portion of the piezoelectric charge generating cycle.

4. The circuit of claim 2, wherein the switch state controller comprises:
    (a) a resistor and a capacitor coupled across the piezoelectric source;
    (b) a comparator having a first input coupled to a first terminal of the resistor and a second input coupled to a second terminal of the resistor, the comparator configured to generate an output representative of a voltage event generated by the piezoelectric source;
    (c) a delay circuit responsive to the comparator output and configured to generate a delay output that is representative of the comparator output that has been delayed by a predetermined amount of time; and
    (d) a logic circuit that is responsive both the comparator output and the delay output and to generate a first switch control signal and a second switch control signal based on a current state of the comparator output and the delay output.

5. The circuit of claim 4, wherein the logic circuit includes an AND gate that is configured to AND the comparator output and the delay output, thereby generating a first switch control signal and wherein the logic circuit includes an NOR gate that is configured to NOR the comparator output and the delay output, thereby generating a second switch control signal.

6. The circuit of claim 5, further comprising:
    (a) a first driver element disposed between the AND gate and the first switch; and
    (b) a second driver element disposed between the NOR gate and the second switch.

7. The circuit of claim 2, wherein the first switch and the second switch each include a first transistor in series with a second transistor, wherein the first transistor has a leakage current that flows in a first direction and the second transistor has a leakage current that flows in a second direction opposite of the first direction, wherein the first transistor and the second transistor each have a gate that is responsive to a switch control signal from the switch state controller.

8. The circuit of claim 2, wherein each of the first unidirectional current directing device and the second unidirectional current directing device comprises:
   (a) a transistor having a gate, a source coupled to a selected one of the third node and the fourth node, and a drain coupled the fifth node; and
   (b) a comparator having a negative input coupled to a selected one of the third node and the fourth node, and a positive input coupled to the fifth node and an output coupled the gate of the transistor.

9. The circuit of claim 8, further comprising a driver element disposed between the output of the comparator and the gate of the transistor.

10. A circuit for harvesting electrical energy, comprising:
    (a) an alternating current source coupled between a first note and a second node;
    (b) a load coupled between a fifth node and the second node;
    (c) an inductor, coupled between a third node and a fourth node, configured to store electrical energy;
    (d) a first switch coupled between the first node and the third node;
    (e) a second switch coupled between the fourth node and the second node;
    (f) a first unidirectional current directing device coupled between the third node and the fifth node and configured to allow current to flow only from the third node to the fifth node;
    (g) a second unidirectional current directing device coupled between the fourth node and the fifth node and configured to allow current to flow only from the fourth node to the fifth node; and
    (h) a switch state controller that is configured to control the first switch and the second switch so as to:
        (i) direct electrical energy from the alternating current source to the inductor during a first portion of an alternating current charge generating cycle; and
        (ii) direct electrical energy from the inductor to the load during a second portion of the alternating current charge generating cycle.

11. The circuit of claim 10, wherein the alternating current source comprises a piezoelectric element.

12. The circuit of claim 10, wherein the load comprises a battery.

13. The circuit of claim 10, wherein the switch state controller is configured to:
    (a) close both the first switch and the second switch during a first portion of a positive current generating portion of the alternating current charge generating cycle;
    (b) maintain the first switch in a closed state and open the second switch during a second portion of the positive current generating portion of the alternating current charge generating cycle;
    (c) close both the first switch and the second switch during a first portion of a negative current generating portion of the alternating current charge generating cycle; and
    (d) open the first switch and maintain the second switch in a closed state during a second portion of the negative current generating portion of the alternating current charge generating cycle.

14. The circuit of claim 10, wherein the switch state controller comprises:
    (a) a resistor and a capacitor coupled across the alternating current source;
    (b) a comparator having a first input coupled to a first terminal of the resistor and a second input coupled to a second terminal of the resistor, the comparator configured to generate an output representative of a voltage event generated by the alternating current source;
    (c) a delay circuit responsive to the comparator output and configured to generate a delay output that is representative of the comparator output that has been delayed by a predetermined amount of time; and
    (d) a logic circuit that is responsive both the comparator output and the delay output and to generate a first switch control signal and a second switch control signal based on a current state of the comparator output and the delay output.

15. The circuit of claim 14, wherein the logic circuit includes an AND gate that is configured to AND the comparator output and the delay output, thereby generating a first switch control signal and wherein the logic circuit includes an NOR gate that is configured to NOR the comparator output and the delay output, thereby generating a second switch control signal.

16. The circuit of claim 15, further comprising:
    (a) a first driver element disposed between the AND gate and the first switch; and
    (b) a second driver element disposed between the NOR gate and the second switch.

17. The circuit of claim 10, wherein the first switch and the second switch each include a first transistor in series with a second transistor, wherein the first transistor has a leakage current that flows in a first direction and the second transistor has a leakage current that flows in a second direction opposite of the first direction, wherein the first transistor and the second transistor each have a gate that is responsive to a switch control signal from the switch state controller.

18. The circuit of claim 10, wherein each of the first unidirectional current directing device and the second unidirectional current directing device comprises:
    (a) a transistor having a gate, a source coupled to a selected one of the third node and the fourth node, and a drain coupled the fifth node; and
    (b) a comparator having a negative input coupled to a selected one of the third node and the fourth node and a positive input coupled to the fifth node and an output coupled the gate of the transistor.

19. The circuit of claim 18, further comprising a driver element disposed between the output of the comparator and the gate of the transistor.

20. A method of harvesting energy from a piezoelectric current generating source, comprising the steps of:
    (a) charging, from the piezoelectric current generating source, an inductor with a first bias during a first positive portion of a piezoelectric charge generating cycle;
    (b) directing current from the inductor to a positive terminal of a load during a second positive portion of the piezoelectric charge generating cycle by coupling a first terminal of the inductor to the positive terminal of the load along a first circuit path;
    (c) charging, from the piezoelectric current generating source, the inductor with a second bias, opposite the first bias, during a first negative portion of the piezoelectric charge generating cycle; and (d) directing current from the inductor to the positive terminal of the load during a second negative portion of the piezoelectric charge generating cycle by coupling a second terminal of the inductor, different from the first terminal of the inductor, to the positive terminal of the load along a second circuit path, different from the first circuit path.

* * * * *